US009484705B2

(12) United States Patent
Russbueldt et al.

(10) Patent No.: US 9,484,705 B2
(45) Date of Patent: Nov. 1, 2016

(54) OPTICALLY END-PUMPED SLAB AMPLIFIER COMPRISING PUMP MODULES ARRANGED IN A DISTRIBUTED MANNER

(71) Applicants: FRAUNHOFER-GESELLSCHAFT ZUR FORDERUNG DER ANGEWANDTEN FORSCHUNG E.V., Munich (DE); RWTH AACHEN, Aachen (DE)

(72) Inventors: Peter Russbueldt, Herzogenrath (DE); Guido Rotarius, Vaals (NL); Thomas Sartorius, Aachen (DE); Johannes Weitenberg, Aachen (DE)

(73) Assignees: FRAUNHOFER-GESELLSCHAFT ZUR FOERDERUNG DER ANGEWANDTEN FORSCHUNG E.V., Munich (DE); RWTH AACHEN, Aachen (DE)

( * ) Notice: Subject to any disclaimer, the term of this patent is extended or adjusted under 35 U.S.C. 154(b) by 0 days.

(21) Appl. No.: 14/440,643

(22) PCT Filed: Nov. 7, 2013

(86) PCT No.: PCT/EP2013/003350
§ 371 (c)(1),
(2) Date: May 5, 2015

(87) PCT Pub. No.: WO2014/072055
PCT Pub. Date: May 15, 2014

(65) Prior Publication Data
US 2015/0295380 A1 Oct. 15, 2015

(30) Foreign Application Priority Data
Nov. 9, 2012 (DE) .................. 10 2012 022 068

(51) Int. Cl.
*H01S 3/06* (2006.01)
*H01S 3/08* (2006.01)
(Continued)

(52) U.S. Cl.
CPC ........... *H01S 3/0604* (2013.01); *H01S 3/0606* (2013.01); *H01S 3/08059* (2013.01);
(Continued)

(58) Field of Classification Search
CPC ............... H01S 3/0604; H01S 3/0606; H01S 3/08059; H01S 3/08081; H01S 3/08095; H01S 3/094084
See application file for complete search history.

(56) References Cited

U.S. PATENT DOCUMENTS

| 5,249,196 A | 9/1993 | Scheps ............................ 372/93 |
| 5,325,390 A * | 6/1994 | Tidwell ..................... H01S 3/08 372/108 |

(Continued)

FOREIGN PATENT DOCUMENTS

| DE | 196 17 711 A1 | 8/1997 | ............. H01S 3/042 |
| DE | 10 2005 034 728 A1 | 2/2007 | ........... H01S 3/0941 |

(Continued)

OTHER PUBLICATIONS

International Search Report mailed Mar. 19, 2014 in corresponding application No. PCT/EP2013/003350.

(Continued)

*Primary Examiner* — Eric Bolda
(74) *Attorney, Agent, or Firm* — Renner Kenner Grieve Bobak Taylor & Weber

(57) ABSTRACT

An optically end-pumped amplifier with a plate-shaped optical gain medium has a plurality of pump laser units for optically pumping the gain medium through at least one of the narrow side surfaces thereof. The pump laser units are designed such that the pump laser radiation, upon passing through the gain medium, has an elongated beam cross section having a short axis and a long axis running parallel to the main surfaces of the gain medium and propagates freely through the gain medium with respect to the short axis. They are arranged such that in each case the principal axes of the beam bundles of the pump laser units impinge on one of the pumped side surfaces in a plane perpendicular to the short axis at an angle to one another, wherein the beam cross sections of the beam bundles are superimposed on one another.

11 Claims, 6 Drawing Sheets

(51) Int. Cl.
*H01S 3/094* (2006.01)
*H01S 3/16* (2006.01)
*H01S 3/0941* (2006.01)

(52) U.S. Cl.
CPC ....... *H01S3/08081* (2013.01); *H01S 3/08095* (2013.01); *H01S 3/09415* (2013.01); *H01S 3/094084* (2013.01); *H01S 3/094096* (2013.01); *H01S 3/1618* (2013.01); *H01S 3/1643* (2013.01); *H01S 3/0625* (2013.01); *H01S 3/09408* (2013.01); *H01S 2301/02* (2013.01)

(56) References Cited

U.S. PATENT DOCUMENTS

| | | | |
|---|---|---|---|
| 5,521,932 A | 5/1996 | Marshall | 372/36 |
| 6,137,820 A | 10/2000 | Maag et al. | 372/108 |
| 6,351,477 B1 | 2/2002 | Du | 372/29.02 |
| 6,421,166 B1* | 7/2002 | Velsko | G02F 1/39 359/326 |
| 6,654,163 B1* | 11/2003 | Du | H01S 3/2325 359/346 |
| 2003/0161376 A1* | 8/2003 | Zapata | H01S 3/0604 372/70 |
| 2004/0052284 A1 | 3/2004 | Krause et al. | 372/70 |
| 2012/0307370 A1* | 12/2012 | Bhatia | H01S 5/4012 359/634 |

FOREIGN PATENT DOCUMENTS

| | | | |
|---|---|---|---|
| WO | WO 97/29529 | 8/1997 | H01S 3/0941 |
| WO | WO 2012/014191 A1 | 2/2012 | H01S 3/00 |

OTHER PUBLICATIONS

Written Opinion mailed Mar. 19, 2014 in corresponding application No. PCT/EP2013/003350.

* cited by examiner

US 9,484,705 B2

OPTICALLY END-PUMPED SLAB AMPLIFIER COMPRISING PUMP MODULES ARRANGED IN A DISTRIBUTED MANNER

CROSS-REFERENCE TO RELATED APPLICATION

This is a §371 application of International patent application No. PCT/EP2013/003350 filed Nov. 7, 2013, which claims the benefit of German patent application No. 10 2012 022 068.5 filed on Nov. 9, 2012, and which is incorporated herein by reference.

TECHNICAL FIELD OF APPLICATION

The present invention relates to an optically end-pumped amplifier and/or oscillator, which has a plate-shaped optical gain medium, which is delimited by two mutually opposite main surfaces and two mutually opposite first and second side surfaces in each case, and a plurality of pump laser units for optically pumping the gain medium through at least one of the first side surfaces. The pump laser units direct pump laser radiation as beam bundles onto at least one first side surface and are designed such that the pump laser radiation, upon passing through the gain medium, has an elongated beam cross section having a short axis and a long axis running parallel to the main surfaces. In the direction of the short axis, the pump laser radiation propagates freely through the medium without touching the main surfaces, the medium is partially end-pumped. Amplifiers or oscillators of this type are also known under the terms InnoSlab amplifiers in connection with mirrors, which deflect the laser beam to be amplified through the gain medium multiple times, or as InnoSlab lasers in connection with an unstable resonator. The gain medium is in this case generally formed by a suitably doped crystal.

An optically pumped amplifier with a plate-shaped gain medium offers many advantages compared to other amplifier or laser concepts. By means of the partial end pumping of an elongated rectangular cross section with a side ratio greater than 1:3, termed a line in the following, a reduction in thermal aberrations compared to an end-pumped rod laser and therefore a good beam quality for high average powers is achieved. The pumped volume can be adapted to the emission characteristic of laser diode bars very well. These amplifiers enable the amplification of laser radiation to high average powers with virtually diffraction-limited beam quality. The average output power can be scaled almost arbitrarily via the width or the aspect ratio of the cross section of the pumped volume. An efficient cooling of the gain medium can be achieved via the two large-area main surfaces of the gain medium.

PRIOR ART

In known arrangements for optically pumping a plate-shaped gain medium, both in oscillators and in amplifiers, a hybrid resonator made from cylindrical mirrors is arranged around the gain medium in order to extract the energy stored in the pumped volume efficiently. Together with the homogeneous cylindrical lens that is formed in the amplifier material during operation, the hybrid resonator is stable perpendicularly to the linearly pumped volume or the correspondingly elongated pump cross section and unstable parallel to the pumped line. As laser diode bars or stacks made up of a plurality of laser diode bars are generally used as pump light sources, the direction perpendicular to the pumped line can also be termed fast direction and the direction parallel to the pumped line can also be termed slow direction. With a suitable resonator design, a diffraction-limited beam quality can be achieved not only in the fast direction, but also in the slow direction. This presumes that the induced thermal lens in the gain medium is homogeneous in the slow direction. This can be achieved by homogenising the radiation distribution of the laser diode bars used for pumping in the slow direction, before they are imaged or focussed into the gain medium.

FIG. 1 shows an example for an amplifier arrangement of this type in a plan view (FIG. 1a) and in a side view (FIG. 1b). The pump light source 1 in this example consists of a stack of laser diode bars, the pump laser radiation of which is coupled via a focussing optical system 2 into a homogeniser 3, which is realised by means of a waveguide. The homogenised pump laser radiation emerging from the homogeniser 3 at the opposite end is then focussed via a pump optical system 4 through one of the resonator mirrors 5 of the hybrid resonator into the gain medium 6, for example an Nd:YVO$_4$ crystal. By means of a suitable construction of the pump laser units 9 consisting of pump light source, focussing optical system, homogeniser and pump optical system, a pump volume, which is linear in cross section, is pumped in the gain medium 6.

Optically pumped amplifiers of this type, also known under the terms InnoSlab lasers or InnoSlab amplifiers, are described for example in WO 97/29529 A1 or in WO 00/74185 A1. DE 196 17 711 A1 also shows an InnoSlab laser or InnoSlab amplifier of this type. The hitherto used pump arrangements for InnoSlab lasers or InnoSlab amplifiers comprise a laser diode stack as pump light source, a focussing optical system, a homogeniser, a pump optical system for focussing into the amplifier crystal and a dichroitic pump mirror, in order to separate laser and pump light radiation.

However, the homogenisation and imaging of the linear power density distribution onto the entry surface of the gain medium for generating the required high pump intensities can be very optically complex. The outlay for the pump optical systems increases with a growing numeric aperture and line thickness or aspect ratio of the beam cross section. This applies in particular, but not exclusively for ytterbium-doped laser materials, which require particularly high pump intensities of the order of magnitude of 50 kW/cm$^2$, small line heights <<1 mm and small pump light divergences in the fast direction. In the case of InnoSlab lasers or InnoSlab amplifiers with ytterbium-doped laser crystals, the hitherto-realised pump optical systems require the largest portion by far of the overall outlay of the laser or amplifier system. For a technically given brightness of laser diode bars (100-200 W, approximately 1000 mm.mrad in the slow direction, as at 2012), it may be necessary for generating the necessary pump intensity in the gain medium or laser crystal, to image the pump laser radiation of the laser diode bars into the gain medium diminished by a factor of 5 in the slow direction. In this case, the image quality of the pump laser radiation of the laser diode bars is obtained in the fast direction during the imaging. The required large numeric aperture for imaging into the amplification medium of NA=0.5 in the slow direction in connection with the large image field in the slow direction whilst receiving the diffraction-limited image quality in the fast direction may for example, for 4 laser diode bars with a combined 600 W pump power, require 2×14 lenses, so that the optical system as a whole of the pump laser units becomes large and expensive. A further difficulty consists, in the incident angle range of the pump laser radiation, in the dichroitic pump mirrors required for separating the laser radiation to be amplified from the pump laser radiation. Although, the large angular range of up to NA 0.5 can be realised technically, this can only be done at the cost of a reduced destruction threshold of the dichroitic pump mirrors, which therefore make these elements the weakest link in the optical chain. Furthermore, owing to the large incident angle, the dichroitic pump mirror prevents pumping with a wavelength close to the laser wavelength, such as for example the zero line of $Yb^{3+}$ laser ions.

US 2004/0052284 A1 describes a slab laser, in which the gain medium is used as waveguide. The pump laser radiation does not propagate freely through the gain medium in this case, as is the case with respect to the short axis in an InnoSlab laser or InnoSlab amplifier. WO 2012/014191 A1 does not relate to an InnoSlab laser or InnoSlab amplifier with the corresponding pump requirements either, but rather to a fibre laser, in which waveguiding takes place in the gain medium.

The object of the present invention consists in specifying an optical amplification arrangement for an InnoSlab laser or InnoSlab amplifier with a plate-shaped gain medium, which requires a lower optical outlay for the pump laser units or enables or facilitates a further power scaling from hitherto approximately 500-1000 W to up to 5000 W and more for the same amplification power as the previously described arrangements of the prior art.

DESCRIPTION OF THE INVENTION

The object is achieved with the optically pumped amplifier or oscillator according to patent claim 1. Advantageous configurations of the amplifier or oscillator are the subject matter of the dependent patent claims or can be drawn from the following description as well as from the exemplary embodiments.

The suggested optically pumped amplifier and/or oscillator, which has a plate-shaped optical gain medium, which is delimited by two mutually opposite main surfaces and two mutually opposite first and second side surfaces in each case. This gain medium may be a doped laser crystal, preferably an ytterbium-doped laser crystal, as is also used in the previously explained InnoSlab lasers or InnoSlab amplifiers. The amplifier or oscillator has a plurality of pump laser units for optically pumping the gain medium through at least one of the first side surfaces, by means of which a laser beam to be amplified propagates through the gain medium. The suggested optically pumped amplifier or oscillator is therefore what is known as an end-pumped or longitudinally pumped amplifier or oscillator, in which the pump laser radiation is coupled into the gain medium essentially along the axis of the laser radiation to be amplified. The first side surfaces, through which both the pump laser radiation and the laser radiation to be amplified enter the gain medium or exit the gain medium, in this case have an essentially rectangular cross section with a larger width than height. The pump laser units direct pump laser radiation as beam bundles onto the at least one first side surface and are designed such that the generated pump laser radiation, upon passing through the gain medium, has an elongated beam cross section having a short axis and a long axis running parallel to the main surfaces of the gain medium, preferably an elongated rectangular beam cross section with a side ratio larger than 1:3. With respect to the short axis, the pump laser radiation propagates freely through the medium in this case, as is known from InnoSlab lasers or InnoSlab amplifiers, that is to say is not guided as in a waveguide. In the direction of the long axis, the power density distribution of the pump laser radiation is preferably at least approximately constant over the width of the gain medium. Here, a pump laser unit is understood to mean the combination of pump laser source and upstream-connected optical system, through which the pump laser radiation is directed onto the gain medium. This optical system can for example be the beam shaping optical system, an optional homogeniser and the pump optical system. Laser diode bars that are individual or stacked above one another are preferably used as pump laser sources. The typical output power of a pump laser unit lies in the range 100-1000 W. The short axis of the beam cross section therefore corresponds to the fast direction, the long axis corresponds to the slow direction of the pump laser beams of the laser diode bars. The pump laser units are also termed pump modules in the following. Other lasers, such as for example solid-state, fibre, dye or gas lasers can also be used as pump laser sources. The pump laser radiation can also be guided via fibre bundles to the pump optical system.

The suggested optically pumped amplifier or oscillator stands out as a result of the fact that on the one hand a plurality of pump laser units in each case are used for pumping through one of the first side surfaces or through both first side surfaces. On the other hand, the optical axes of the pump laser units are arranged such that the principal axes of the beam bundles of the pump laser units impinge on the respective first side surface in a plane perpendicular to the short axis at an angle to one another, i.e. not parallel to one another, and in the process the beam cross sections of the beam bundles are superimposed on one another on the first side surface. In this case, the pumping can take place from one side, i.e. via one of the first side surfaces or else symmetrically from both sides, i.e. via both side surfaces. In this case, the principal axis of the beam bundle is understood to mean the axis of the focal point of the beam bundle.

In the suggested amplifier arrangement, the hitherto realised one pump beam path per side or first side surface of the gain medium is divided into $N \geq 2$ beam paths or pump laser units, which direct the pump laser radiation onto the respective side surface at various angles in the plane parallel to the main surfaces of the gain medium. For a given brightness of the laser diodes preferably used as pump light source, the numeric aperture of the individual incident beam bundles in the slow direction or in the plane parallel to the main surfaces of the gain medium can consequently be diminished to the N-th fraction. The numeric aperture of the incident pump laser radiation is large in the slow direction, whilst it is negligibly small in the fast direction. As a result, the numeric aperture of the optical system of the individual pump laser units required on the image side can be reduced to the N-th fraction by division to a plurality of pump laser units. The necessary pump intensity in the gain medium is then achieved by angular superimposition of the N beam bundles of the pump laser radiation. This simplifies the optical structure of the individual pump laser units considerably owing to the smaller numeric aperture and enables a lowering of the costs thanks to the replacement of one or two (in the case of pumps on both sides) complex pump laser units by much smaller, more simply constructed, identically structured and therefore economically manufacturable pump laser units. The number of optical elements per pump laser unit can be reduced as a result. In the case mentioned in the introduction to the description, for a doubling of the number of pump units to 4 pump units according to FIG. 2, the number of lenses is reduced from 14 to 10. At the same time, the required diameter of the pump optical systems and the length of the beam paths in the pump laser units are reduced by approximately half. As a result, the entire pump arrangement can be realised more compactly. A further advantage of the suggested angular superimposition of many simpler, identically constructed pump laser units, is the simple scaling to larger widths of the gain media or slab crystals and larger pump powers. With a substantially standardised pump laser unit, a laser platform for different laser power classes can then be realised owing to the modularity, due to the option of superimposing the pump laser beam bundles of different numbers of these pump laser units or pump modules at an angle.

In an advantageous configuration of the suggested amplifier, the gain medium is arranged between at least two mirrors, which deflect the laser beam to be amplified multiple times through the gain medium, preferably on a zig-zag line with beam expansion in the plane parallel to the main surfaces of the gain medium. This may be an InnoSlab arrangement, as has already been explained in the introduction to the description. The pump laser units are then arranged in such a manner in the suggested amplifier, that they pump the gain medium past the resonator mirrors. Thus, passage through one of the resonator mirrors is not necessary, so that dichroitic mirrors can be dispensed with. This allows the pumping with wavelengths in directly proximate to the laser wavelength (zero line pumping) without limitation due to the design of dichroitic pump mirrors. Thus, for example, ytterbium-doped laser crystals can also be pumped with two different wavelengths, e.g. at 940 nm and 968 nm for Yb:YAG crystals, and therefore due to wavelength superimposition, the pump intensity can be increased. Pumping at 968 nm is not or only possible to a limited extent whilst retaining previous pump arrangements according to the prior art owing to the mirror design of dichroitic pump mirrors. The wavelength superimposition can in this case take place directly at the location of pump laser sources or laser diodes or else only in the gain medium by means of two separate pump laser units of different wavelength. If pumping takes place via both first side surfaces, then pump laser units of different wavelength may be located opposite one another at the gain medium in each case, in order to achieve a folding back of the pump laser radiation via suitable dichroitic mirrors. The gain medium must in this case of course enable the pumping at these wavelengths. The pump laser radiation of one wavelength propagated through the gain medium is in this case reflected back into the gain medium via a dichroitic mirror arranged in the pump beam path of the opposite pump laser unit and vice versa. The same is also true for the polarisation of the pump laser sources. The pump intensity can likewise be increased by polarisation coupling at the site of the pump laser sources. The polarisation can also be used as in the case of the different wavelengths for folding back the pump laser radiation. A combination of different polarisations and different wavelengths is also possible for increasing the pump intensity. By combining both technologies of different polarisation and different wavelength, the required numeric aperture for achieving the required pump intensity can be reduced again. This then in turn also reduces the outlay for the individual pump laser units and constitutes a further considerable (implicit) advantage of the angularly superimposed pump arrangement according to the present invention.

In a preferred configuration of the suggested amplifier, the second side surfaces of the gain medium are optically polished and the first side surfaces run at an angle ≠90° to the main surfaces, which in turn are not optically polished, but rather are preferably roughened or ground. Conventionally, plate shaped gain media according to the prior art are only polished at the first side surfaces for the entrance and exit of the pump radiation and the amplified laser radiation and ground matt at the second side surfaces, in order to suppress parasitic oscillations within the gain medium, what are known as gallery modes. However, in the suggested configuration, the second side surfaces are also optically polished, in order to achieve as even a distribution as possible of the pump laser radiation over the width of the gain medium and over a larger depth of the gain medium by means of waveguiding or reflection. However, gallery modes could be formed by these polished second side surfaces, which are then prevented by the tipping of the first side surfaces. In this manner, a symmetrical illumination can be achieved when pumping the gain medium from one or both sides without the formation of such disruptive gallery modes.

The pump laser units are preferably arranged or orientated in such a manner with regards to the respective first side surface that the pump laser beams impinge symmetrically onto the first side surface in pairs in each case. This is to be understood to mean that in the incident plane spanned by the pump laser beams, the perpendicular to the first side surface also forms the angle bisector of in each case two of the pump laser beams. Preferably, an even number of pump laser units is used for each first side surface. An odd number of pump laser units is also conceivable however, as a paired symmetrical arrangement for a pump module, the principal axis of which is perpendicular to the first side surface, coincides with itself. When pumping through both first side surfaces, the arrangement of the pump laser units on the one side of the gain medium is in this case preferably chosen mirror-symmetrically to the arrangement of the pump laser units on the other side of the gain medium, so that both sides are also pumped symmetrically to one another. This leads to an even distribution of the pump laser radiation in the gain medium. For an identical number of pump laser units on both sides of the gain medium, the pump laser powers of the individual pump laser units are preferably the same. Different pump laser powers for the individual pump laser units can also be used however, in particular for unequal numbers of pump laser units on both sides of the gain medium.

The suggested amplifier can fundamentally be constructed such that the laser beam to be amplified only runs through the gain medium once. However, a folded arrangement is preferably used, in which the laser beam can be deflected through the gain medium multiple times via one or a plurality of mirrors. In the present patent application, the optical amplifier is also understood to mean a laser oscillator with a corresponding gain medium or laser crystal.

The suggested optical amplifier is suitable in particular for realising q-switched oscillators with short ns pulse durations and for the amplification of pulsed laser radiation to high average powers for virtually diffraction-limited beam quality. The average output power can be scaled almost arbitrarily into the kW range via the width or the aspect ratio of the pumped volume.

SHORT DESCRIPTION OF THE DRAWINGS

The suggested optically pumped amplifier is explained again in more detail on the basis of exemplary embodiments in connection with the drawings. In the figures.

WAYS OF REALISING THE INVENTION

Figure 1:
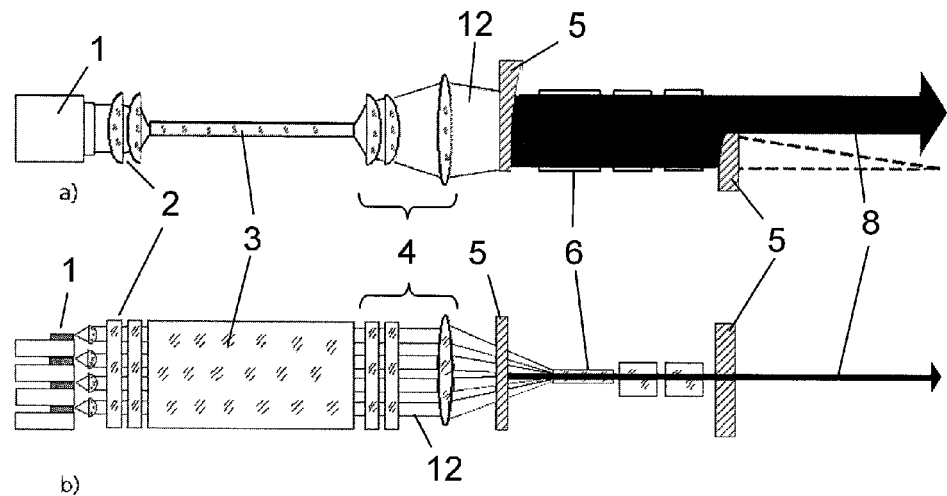
FIG. 1 shows an example for an optically pumped amplifier of the prior art.
Figure 2:
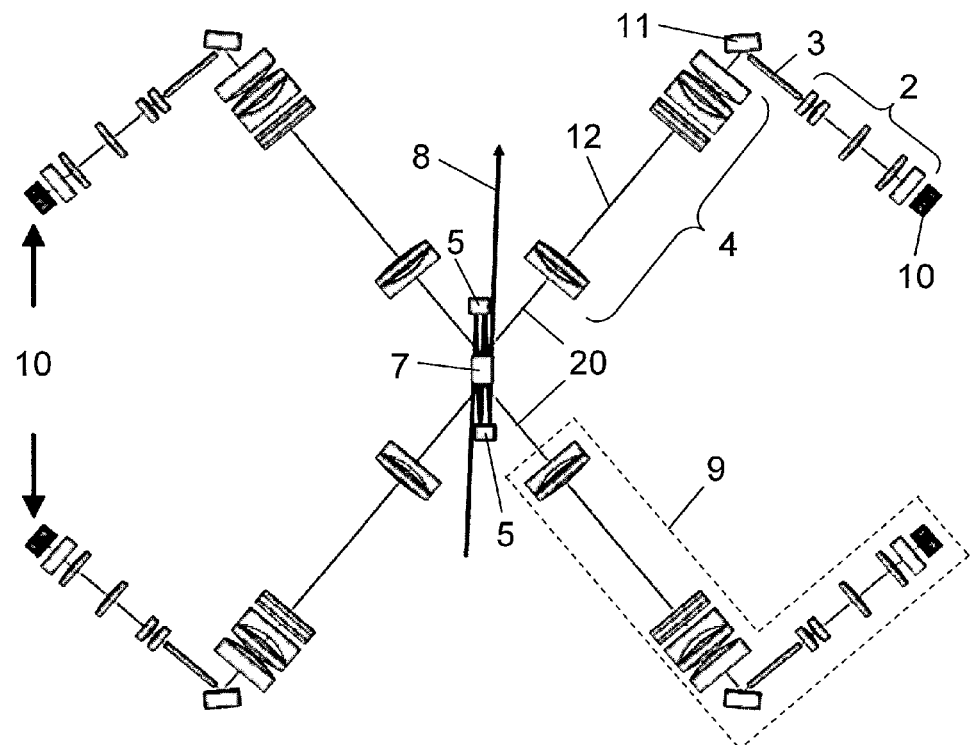
FIG. 2 shows a first example for an optically pumped amplifier according to the present invention.

The pump arrangements known from the prior art for optically end-pumped amplifiers have already been explained in connection with FIG. 1 in the introduction to the description. FIG. 2 then shows an example for an optically end-pumped amplifier according to the present invention. The arrangement shown in FIG. 2 shows a slab crystal 7 as gain medium between two resonator mirrors 5. The laser beam 8 to be amplified is folded by these mirrors twice, so that it passes through the slab crystal 7 three times in total. In the present example, two pump modules 9 are used for each side of the slab crystal 7, which are arranged symmetrically in each case with respect to the respective side surface and also mirror-symmetrically with respect to one another. Each pump module has a laser diode bar 10, an upstream-connected focussing optical system 2 for coupling into a homogeniser 3, i.e. here a waveguide suitable for the homogenisation of the pump laser radiation, a deflecting mirror 11 and a pump optical system 4. Due to the angularly superimposed pumping of the slab crystal 7, the respective beam bundles of the pump laser radiation 12 impinge on the respective side surfaces of the slab crystal 7 past the mirrors 5, so that no dichroitic pump mirrors are required. By pumping the respective side surface through two separate, angularly superimposed pump laser radiation bundles 12, which are indicated in FIG. 2 as lines corresponding to the principal axes 20 of the beam bundles, a smaller numeric aperture must be achieved for the individual pump modules 9 than in the case of pumping with only one pump module per side surface according to the prior art. As a result, the number of optical elements, particularly of lenses, is reduced in the respective pump module compared to the prior art. The pump modules 9 and therefore the entire pump arrangement can therefore also be realised more compactly. Of course, the number of pump modules 9 per side surface can also be increased.

Figure 3:
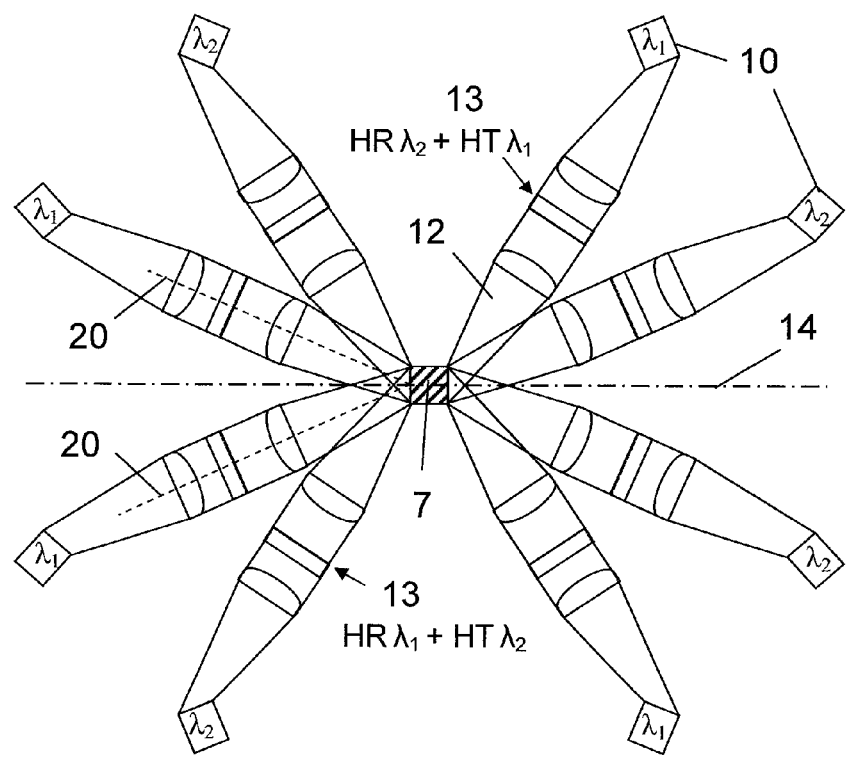
FIG. 3 shows a second example for an optically pumped amplifier according to the present invention.

For an exemplary width of the slab crystal 7 of 10-40 mm, the following parameters or dimensions can be used for example for the pump modules:
- Height of the pumped line 0.2-2 mm
- Pump power per module 100-1000 W
- Maximum lens diameter in the pump modules 1-5× slab width, typically 2-3×
- Overall length of the individual pump modules 10-30× slab width FIG. 3 shows a further example of a pump arrangement according to the present invention. In this example, only the gain medium 6 is illustrated with the individual pump modules 9. Here four pump modules 9 are used for each side surface of the gain medium 6 to be pumped. On each side, these pump modules 9 are arranged symmetrically in pairs. The pump modules of the left side are in turn arranged mirror symmetrically to the pump modules of the right side, as can be seen from FIG. 3. In this example, laser diode bars 10 are used as pump laser sources, which emit at different wavelengths $\lambda 1$, $\lambda 2$. This is likewise indicated in the figure. Here, a wavelength superimposition takes place in the gain medium 6. In this manner, the pump power density and/or the energy deposited in the gain medium can be increased. The laser diode bars 10 can also consist of two polarisation-coupled laser diodes in each case. In the example of FIG. 3, what is known as folding back of pump light additionally takes place again, in which a portion of the pump laser radiation that has passed through the gain medium and not been absorbed is guided through the gain medium again via a mirror. To this end, pump modules of different wavelengths are in each case arranged oppositely in the beam direction of the pump laser radiation, as is illustrated in the figure. As a result, dichroitic mirrors 13 can be used in the respective beam paths, which are transparent for the wavelength of the pump laser radiation of the respective pump module, but are highly reflective for the wavelength of the pump laser beam that has passed through the gain medium from the opposite side.

For the angularly superimposed pumping of the suggested amplifier, a waveguiding of the pump laser radiation is enabled in the slow direction in the gain medium. This necessitates optically polished second side surfaces of the gain medium. To prevent gallery modes, the first side surfaces should then be tipped with respect to a perpendicular orientation with respect to the main surfaces and these main surfaces are not polished, i.e. e.g. are roughened or ground. For an even distribution of the pump laser radiation in the gain medium, a symmetrical arrangement of the pump modules with respect to the respective side surface should additionally be chosen.

In the case of previously realised pump arrangements for InnoSlab lasers, the pump radiation is radiated on the optical axis 14 of the laser or amplifier, as is indicated in FIG. 3, and with a small numeric aperture through the first side surfaces. In addition, the slab crystal is generally so highly doped that the pump laser radiation 12 is already absorbed in the front region of the laser crystal, as is illustrated schematically in FIG. 4a as viewed through one of the main surfaces of the slab crystal 7. Therefore, the four remaining side surfaces of the slab crystal, i.e. the two main surfaces and the two side surfaces, are ground matt and only the two first side surfaces are optically polished. As a result, parasitic oscillations within the laser crystal (gallery modes) are suppressed.

Figure 4:
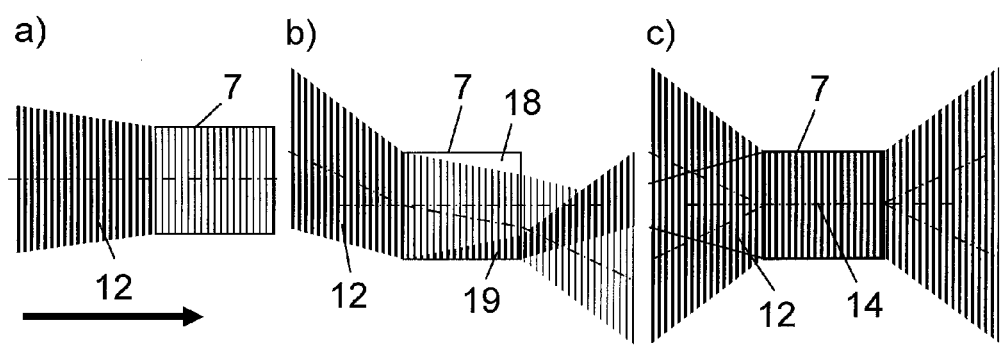
FIG. 4 shows an illustration of the distribution of the pump laser radiation in the gain medium when viewed through one of the main surfaces.

In the case of the present optically end-pumped amplifier, the gain medium is preferably also optically polished on the two second side surfaces. The reason for this is explained on the basis of FIG. 4. If the pump light radiation 12 falls at an angle to the optical axis onto the first side surface or facet of the slab crystal 7, then shade regions 18 are formed within the slab crystal. This is illustrated in FIG. 4b. The slab crystal is consequently pumped unevenly over the width. In the case of InnoSlab lasers, this leads to an impairment of the beam characteristics and should be prevented. By polishing of the second side surfaces of the slab crystal as well, these are likewise realised as optical surfaces, so that the pump radiation 12 is guided in the slow direction in the slab crystal 7 as a waveguide. As a result, initially a superimposition region 19 is created, in which a pump light power, which is twice as large, is absorbed. The superimposition region 19 is likewise illustrated in FIG. 4b. If one then arranges pump modules in pairs symmetrically around the optical axis 14 of the laser or amplifier, then an even pump light absorption is achieved over the width of the slab crystal 7, as can be seen in FIG. 4*c*. The FIGS. 4*a-c* in each case show the plan view onto one of the main surfaces of the slab crystal 7.

Figure 5:
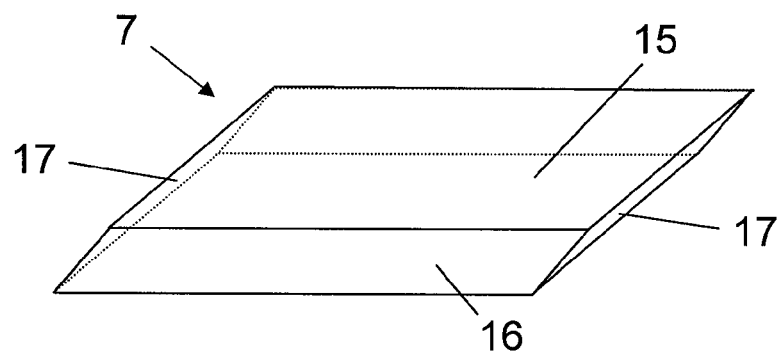
FIG. 5 shows an example for the tipping of the first side surfaces of the gain medium in a configuration of the suggested amplifier.
Figure 5:
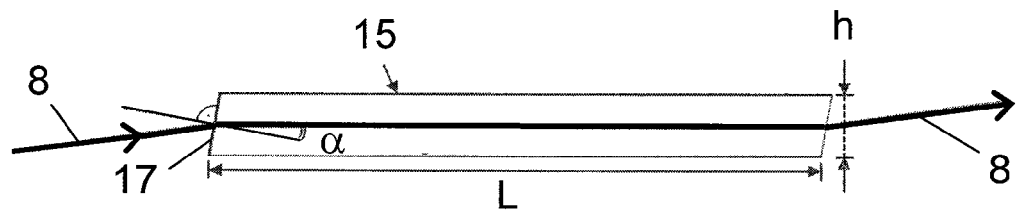

However, due to the optically polished side surfaces of the slab crystal, which are required for the waveguiding of the pump radiation, gallery modes can form, which make laser operation impossible. To prevent this, the first side surfaces or entrance facets of the slab crystal 7 must be tipped so strongly that no undesired mode can be formed without including the two large main surfaces, which are also used for heat dissipation. This is illustrated in FIG. 5, which in the upper part shows the slab crystal 7 with one of the ground main surfaces 15 and a polished second side surface 16 and the two first side surfaces 17 in a perspective illustration. Illustrated in the lower part is a cross section through this slab crystal 7 perpendicularly to the main surfaces 15 and first side surfaces 17, which shows the tipping angle α of the two first side surfaces 17. In this cross section, the tipping angle α is the angle between the surface normals to the first side surface 17 and one of the main surfaces 15. The vibration stimulation of the undesired modes is suppressed by the scattering on the ground rough surface of the two main surfaces 15. So that no gallery modes can be formed, which only run over the optically polished first side surfaces 17 and the optically polished second side surfaces 16 required for the waveguiding of the pump light, but the ground main surfaces 15 for heat dissipation are also included in the gallery modes, the tipping angle must be α>~arctan(h/L), where L corresponds to the length of the slab crystal in the direction of the optical axis and h corresponds to the height, i.e. the spacing of the two main surfaces 15. Then, e.g. α=6° results for h=1 mm and L=10 mm. In the case of 3- or quasi 3-level laser crystals, such as Yb:YAG, the tipping angle α can also be smaller. In this case, use is made of the fact that only the central region of the slab crystal is pumped and the surrounded, non-pumped laser material absorbs the laser radiation. If the path length of possible gallery modes through unpumped regions is so large that the absorption is larger in these regions than the amplification in the pumped region, gallery modes are likewise suppressed.

Figure 6A:
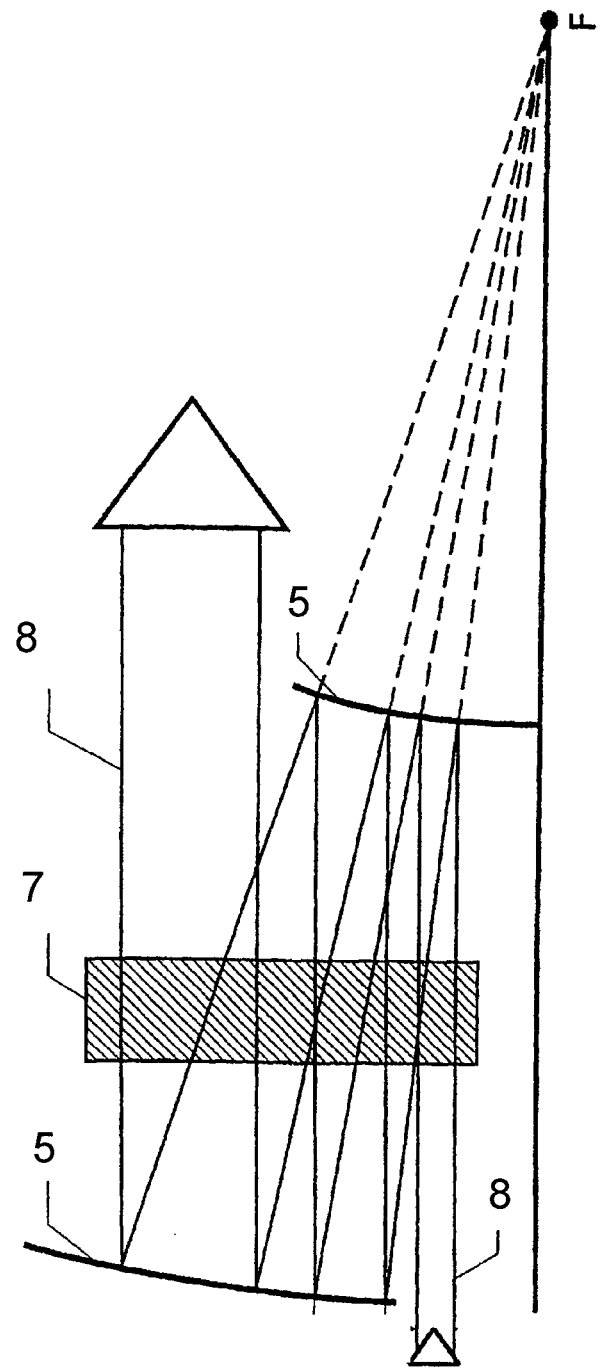
FIG. 6a shows an example for the beam path of the laser beam to be amplified through the gain medium in a plan view onto the main surface of the gain medium.
Figure 6B:
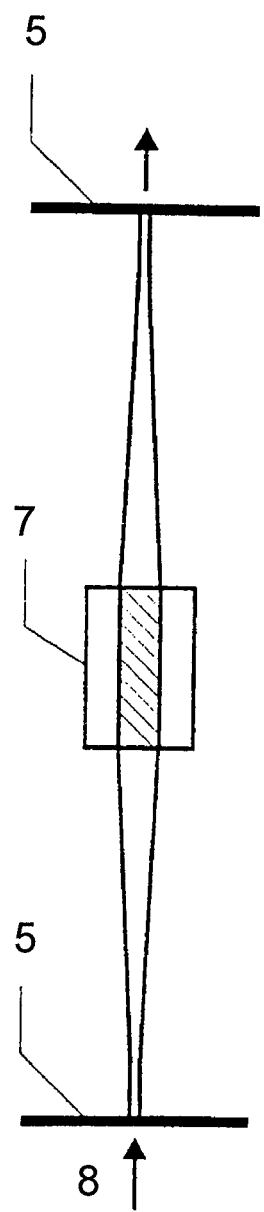
FIG. 6b shows the example of FIG. 6a in a side view.

An exemplary beam course of the laser radiation 8 to be amplified between the resonator mirrors 5 is indicated in FIG. 3. FIG. 6*a* shows a further example in a plan view onto the main surface of the slab crystal 7 as gain medium, in which the laser beam propagates on a zig-zag line with beam expansion in the plane parallel to the main surfaces between the resonator mirrors 5. An approximately constant power density is achieved during the amplification due to the beam expansion. The two resonator mirrors are designed and arranged in such a manner in this arrangement that they form a type of hybrid resonator, which is unstable in the plane parallel to the main surfaces of the slab crystal 7 and stable in the plane perpendicular thereto. To this end, cylindrical resonator mirrors 5 are used in the present example, the foci of which together lie at a point F outside of the resonator. The input beam is coupled off-axis into the resonator, as can be seen in FIG. 6*a*. FIG. 6*b* shows the ratios in a side view (plan view onto the second side surface of the slab crystal). The arrangement of the resonator mirror 5 is chosen in such a manner that one beam waist in each case impinges on the resonator mirrors 5, taking account of the thermal lens action of the slab crystal 7.

Figure 7:
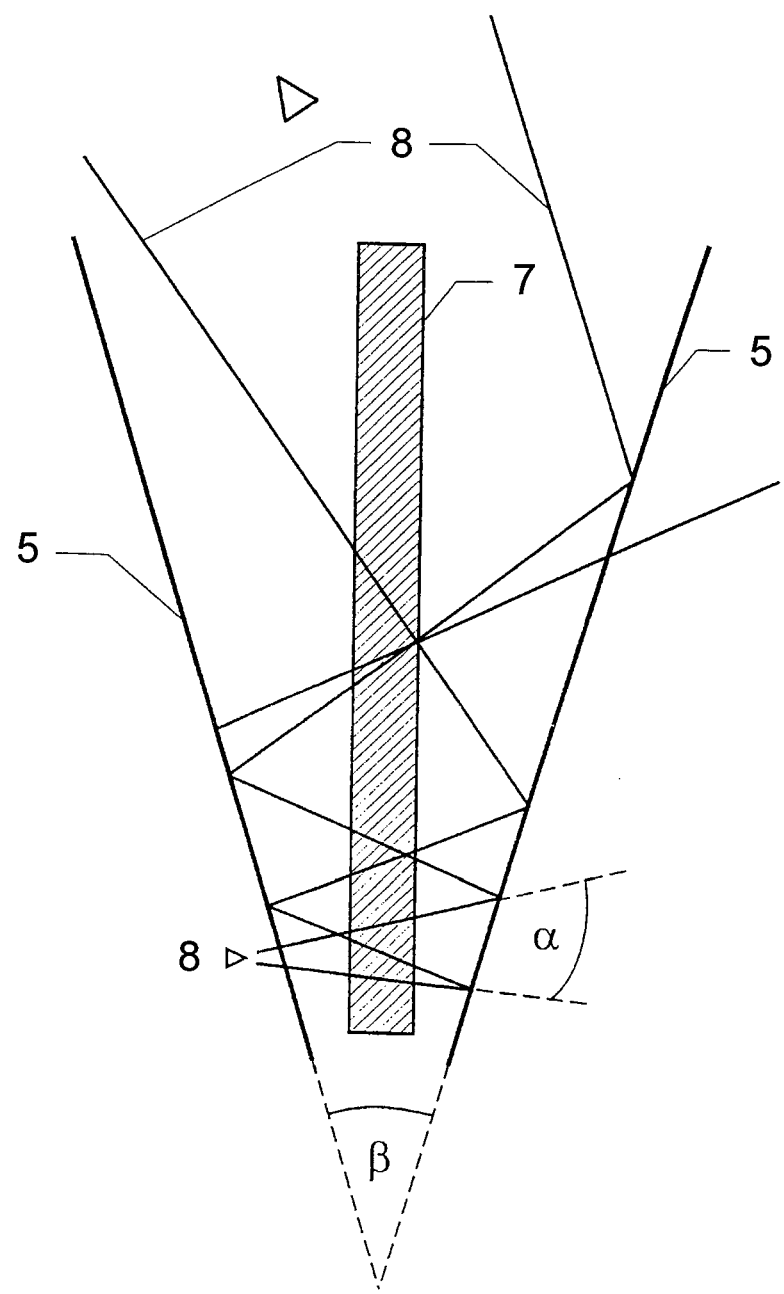
FIG. 7 shows a further example for the beam path of the laser beam to be amplified through the gain medium in a plan view onto the main surface of the gain medium.

A particularly simple resonator arrangement is illustrated in FIG. 7 in a plan view onto the main surface of the slab crystal 7. In this configuration, two planar resonator mirrors 5 are used, which are arranged at an angle β to one another, which approximately corresponds to the full divergence angle of the laser beam 8 to be amplified. The pump modules are not illustrated in FIGS. 6 and 7.

The above-illustrated arrangements of course only illustrate examples. Thus, although the symmetrical arrangement (mirror symmetrical to the optical axis) in FIG. 3 is advantageous, it is not absolutely necessary for the function of the suggested optical amplifier. In the case of amplifier materials, which absorb the laser radiation to be amplified in the unpumped state, the tipping of the first side surfaces in the previous configuration of the suggested amplifier can also turn out to be smaller than described. Each pump module with a beam path geometrically separate from the other pump modules preferably excites the gain medium in the slow direction over the entire or virtually entire width of the gain medium. Thus, the geometrically separate beam path of the pump modules are spatially superimposed at the site of the gain medium via the angle. A stacking of beam cross sections or pump lines does not take place in this case.

REFERENCE LIST

1 Pump light source
2 Focussing optical system
3 Homogeniser
7 Pump optical system
5 Resonator mirror
6 Gain medium
7 Slab crystal
8 Laser beam
9 Pump laser unit/pump module
10 Laser diode bars
11 Deflecting mirror
12 Pump laser radiation
13 Dichroitic mirror
14 Optical axis
15 Main surface
16 Second side surfaces
17 First side surfaces
18 Shade region
19 Superimposition region
20 Principal axis

The invention claimed is:

1. An optically pumped amplifier and/or oscillator, which has a plate-shaped optical gain medium, which is delimited by two mutually opposite main surfaces and two mutually opposite first and second side surfaces in each case, and a plurality of pump laser units for optically pumping the gain medium through at least one of the first side surfaces, via which a laser beam to be amplified propagates through the gain medium,
   wherein the pump laser units direct pump laser radiation onto the at least one first side surface as beam bundles and are designed such that the pump laser radiation emitted by the pump laser units, upon passing through the gain medium, has an elongated beam cross section having a short axis and a long axis running parallel to the main surfaces and propagates through the gain medium without being guided by the main surfaces, characterised,
   in that the pump laser units are arranged such that in each case, the main axes of the beam bundles of a plurality of pump laser units impinge on one of the first side surfaces or on both first side surfaces in a plane perpendicular to the short axis at an angle to one another, and the beam cross sections of the beam bundles are in each case superimposed on one another on the first side surface(s).

2. The optically pumped amplifier and/or oscillator according to claim 1, characterised
in that the second side surfaces are optically polished and the first side surfaces run at an angle ≠90° to the main surfaces.

3. The optically pumped amplifier and/or oscillator according to claim 1, characterised
in that the gain medium is arranged between at least two mirrors, which deflect the laser beam to be amplified multiple times through the gain medium.

4. The optically pumped amplifier and/or oscillator according to claim 3, characterised,
in that the at least two mirrors deflect the laser beam to be amplified with beam expansion on a zig-zag line through the gain medium.

5. The optically pumped amplifier and/or oscillator according to claim 3, characterised
in that the pump laser units are arranged such that they direct the pump laser radiation past the mirrors onto the respective first side surface.

6. The optically pumped amplifier and/or oscillator according to claim 1, characterised
in that the pump laser units are arranged such that they direct the beam bundles symmetrically onto the respective first side surface in a plane spanned by the principal axes.

7. The optically pumped amplifier and/or oscillator according to claim 1, characterised
in that each of the first side surfaces of the gain medium is pumped by the same number of pump laser units, wherein the pump laser units are arranged on the one side of the gain medium mirror symmetrically to the pump laser units on the other side of the gain medium.

8. The optically pumped amplifier and/or oscillator according to claim 1, characterised
in that at least two of the pump laser units emit pump laser radiation with wavelengths that are different from one another.

9. The optically pumped amplifier and/or oscillator according to claim 7, characterised
in that pump laser units in each case opposite one another on the gain medium in the pump laser beam direction emit pump laser radiation with wavelengths that are different from one another.

10. The optically pumped amplifier and/or oscillator according to claim 9, characterised
in that in each case, a dichroitic mirror is arranged in the beam path of the pump laser radiation of the mutually opposite pump laser units such that it reflects pump laser radiation of the respective opposite pump laser unit propagated through the gain medium back into the gain medium.

11. The optically pumped amplifier and/or oscillator according to claim 1, characterised
in that the pump laser units as pump laser sources have individual or polarisation-coupled laser diode bars or horizontal and/or vertical stacks made up of laser diode bars.

* * * * *